(12) United States Patent
Edgar, III et al.

(10) Patent No.: US 7,995,460 B2
(45) Date of Patent: *Aug. 9, 2011

(54) CONTROL INTERFACE PROTOCOL FOR TELEPHONE SETS FOR A SATELLITE TELEPHONE SYSTEM

(75) Inventors: Clement B. Edgar, III, San Diego, CA (US); R. Nicholson Gibson, Boulder, CO (US)

(73) Assignee: QUALCOMM Incorporated, San Diego, CA (US)

( * ) Notice: Subject to any disclaimer, the term of this patent is extended or adjusted under 35 U.S.C. 154(b) by 1296 days.

This patent is subject to a terminal disclaimer.

(21) Appl. No.: 10/828,896

(22) Filed: Apr. 20, 2004

(65) Prior Publication Data

US 2004/0196823 A1 Oct. 7, 2004

Related U.S. Application Data

(60) Continuation of application No. 09/732,805, filed on Dec. 7, 2000, now Pat. No. 6,724,753, which is a division of application No. 09/201,701, filed on Nov. 30, 1998, now Pat. No. 6,266,540.

(51) Int. Cl.
*H04L 1/00* (2006.01)
(52) U.S. Cl. ........ 370/216; 370/230; 370/235; 370/252; 714/749
(58) Field of Classification Search ............ 714/749
See application file for complete search history.

(56) References Cited

U.S. PATENT DOCUMENTS

| 4,661,902 A | | 4/1987 | Hochsprung et al. ......... 370/448 |
| 4,905,234 A | * | 2/1990 | Childress et al. ............. 370/349 |
| 5,191,626 A | * | 3/1993 | Stern ............................... 385/24 |
| 5,278,892 A | * | 1/1994 | Bolliger et al. ............... 455/442 |
| 5,410,536 A | | 4/1995 | Shah et al. ..................... 370/216 |

(Continued)

FOREIGN PATENT DOCUMENTS

EP 0173364 3/1986

OTHER PUBLICATIONS

International Search Report, PCT/US99/028200, International Searching Authority, European Patent Office, Aug. 11, 2000.

*Primary Examiner* — Chi H. Pham
*Assistant Examiner* — Shick Hom
(74) *Attorney, Agent, or Firm* — Stanton C. Braden

(57) ABSTRACT

A control interface protocol governs communications in a satellite telephone system. The satellite telephone system comprises a radio antenna unit (RAU) and a plurality of desksets connected to the RAU. An interface bus connects the desksets to the RAU. The RAU and the desksets communicate with each other by packets. Each packet comprises a start of header (SOH) byte, an address number (ADDR) byte, a command (CMD) byte, an argument (ARG) and a block check character (BCC). The ADDR byte comprises a source and a destination address of the packet. All packets, except negative acknowledgment (NAK) packets from the desksets, are acknowledged by the RAU. The packets originating from the desksets are tagged with an address of the desksets. A packet to a specific deskset includes a destination address. A packet originating from the RAU to all desksets includes a first default address. A packet originating from the RAU to a deskset that does not have an address includes a second default address.

9 Claims, 9 Drawing Sheets

U.S. PATENT DOCUMENTS

| | | | | |
|---|---|---|---|---|
| 5,475,681 | A | 12/1995 | White et al. | 370/349 |
| 5,491,812 | A * | 2/1996 | Pisello et al. | 709/236 |
| 5,574,748 | A | 11/1996 | Vander May et al. | 375/139 |
| 5,754,769 | A * | 5/1998 | Harris et al. | 709/250 |
| 5,787,355 | A | 7/1998 | Bannister et al. | 455/458 |
| 5,793,751 | A * | 8/1998 | Baker et al. | 370/250 |
| 5,799,067 | A | 8/1998 | Kikinis et al. | 379/93.06 |
| 5,841,841 | A * | 11/1998 | Dodds et al. | 379/93.08 |
| 5,859,847 | A | 1/1999 | Dew et al. | 370/389 |
| 5,883,944 | A | 3/1999 | Burke et al. | 379/159 |
| 5,938,748 | A * | 8/1999 | Lynch et al. | 710/53 |
| 5,953,676 | A | 9/1999 | Berry et al. | 455/564 |
| 5,963,539 | A | 10/1999 | Webber, Jr. et al. | 370/213 |
| 5,978,578 | A * | 11/1999 | Azarya et al. | 717/100 |
| 6,011,806 | A | 1/2000 | Herring | 370/494 |
| 6,058,104 | A | 5/2000 | Snelling et al. | 370/277 |
| 6,208,627 | B1 * | 3/2001 | Menon et al. | 370/328 |
| 6,266,540 | B1 * | 7/2001 | Edgar et al. | 455/557 |
| 6,290,661 | B1 | 9/2001 | Cutler et al. | 601/49 |
| 6,389,016 | B1 * | 5/2002 | Sabaa et al. | 370/389 |
| 6,597,687 | B1 | 7/2003 | Rao | 370/352 |
| 6,724,753 | B2 * | 4/2004 | Edgar et al. | 370/352 |
| 6,909,717 | B1 * | 6/2005 | Higgins | 370/394 |
| 2001/0006517 | A1 * | 7/2001 | Lin et al. | 370/348 |
| 2002/0059066 | A1 * | 5/2002 | O'Hagan | 704/231 |

* cited by examiner

| 1 | CMD CODE | | ARGUMENT SIZE IN BYTES | |
|---|---|---|---|---|

FIG. 7

| SOURCE | SEQUENCE NUMBER | SOURCE/DESTINATION ADDRESS |
|---|---|---|

FIG. 8

| $t_a$ | DESCRIPTION |
|---|---|
| 1374 μs | DESKSET WITH ADDRESS 1 |
| 1748 μs | DESKSET WITH ADDRESS 2 |
| 2122 μs | DESKSET WITH ADDRESS 3 |
| 2496 μs | DESKSET WITH ADDRESS 4 |
| 2870 μs | DESKSET WITH ADDRESS 5 |
| 3244 μs | DESKSET WITH ADDRESS 6 |
| 3618 μs | DESKSET WITH ADDRESS 7 |
| 3992 μs | DESKSET WITH ADDRESS 8 |
| 5000 μs | RADIO MODULE |
| SPECIAL | DESKSET WITHOUT ANY ADDRESS |

FIG. 9

CONTROL INTERFACE PROTOCOL FOR TELEPHONE SETS FOR A SATELLITE TELEPHONE SYSTEM

CROSS-REFERENCE TO RELATED APPLICATIONS

Claim of Priority under 35 U.S.C. §120

The present application for patent is a continuation and claims priority to patent application Ser. No. 09/732,805 entitled "Control Interface Protocol for Telephone Sets for a Satellite Telephone System" filed Dec. 7, 2000, now U.S. Pat. No. 6,724,753, which is a division of patent application Ser. No. 09/201,701 entitled "Control Interface Protocol for Telephone is a division of Sets for a Satellite Telephone System" filed Nov. 30, 1998, now U.S. Pat. No. 6,266,540 and assigned to the assignee hereof and hereby expressly incorporated by reference herein.

BACKGROUND OF THE INVENTION

I. Field of the Invention

The present invention relates generally to multi-access communication systems. More specifically, the present invention relates to a control interface protocol for telephone sets for use in a satellite telephone system.

II. Related Art

Many communication systems, such as satellite systems, multidrop telephone lines, and multitap bus systems use multi-access communication configurations. Generally, in a multi-access communication system, a plurality of nodes are connected to a single multi-access channel or an interface bus. Each node has a queue of packets, representing data to be transmitted over or by the interface bus. The interface bus views all waiting packets as one combined queue to be served by an appropriate protocol.

Several methods for access to an interface bus have been developed for multi-access communication systems. One method is the "free-for-all" method in which nodes normally send new packets immediately, hoping for no interference from other nodes. The problem, however, is that packets need to be retransmitted when collisions, that is, interference, occur. The other method is the "perfectly scheduled" method in which there is some order in which nodes are allocated reserved time intervals for interface bus access.

Multi-access channels are being considered for interfacing the components of various satellite telephone systems currently under development. For example, multi-access channels are being considered for providing service for fixed user terminal (UT) systems planned for use in some satellite communication systems. A fixed UT, also called as a subscriber unit or communications terminal, can be a telephone, a wireless unit or a fixed station. The fixed UT is designed to operate from a fixed location. Generally, the fixed UT includes a radio antenna unit (RAU) and one or more telephone sets (also called desksets) connected to the RAU.

A remote location with party line service can be efficiently linked to a satellite or other wireless communications system through a radio antenna unit (RAU). An RAU is a transceiver, comprising well known elements, that transmits and receives a modulated carrier signal to and from the satellite communications system through an antenna. The RAU generally includes a receiver, a transmitter and other signal processing circuitry required for wireless operations. The RAU provides receive and transmit capabilities for one or more telephone sets. During transmission, the RAU accepts audio signals from the multiple phones. An audio coder-decoder (or audio codec) in the RAU digitizes the audio signals, which are then used to modulate the carrier signal that is radiated to a satellite (or other relay apparatus) by the antenna. During reception, the RAU receives an input signal comprising a modulated carrier signal from a satellite. The RAU demodulates the input signal to retrieve the digital audio signal. After which, the audio codec converts the digital audio signal to an analog audio signal, and causes the analog audio signal to be sent to the multiple phones. The RAU can use a variety of additional signal processing and control elements as desired, and known in the art.

There are various advantages associated with the fixed UT. The fixed UT is relatively inexpensive to implement. The fixed UT appears to be especially suitable at remote locations, such as oil rigs, isolated rural areas, and the like where it may not be economically feasible to link such remote areas by land lines.

The fixed UT also appears to be suitable in areas where a typical wireless local loop may not be economically feasible. In a wireless local loop, multiple cellular telephones communicate via a base station (cell site or station). The base station is connected to a public switched telephone network (PSTN) through land lines. However, in some areas, there may not be enough wireless telephone users to justify the installation of a base station. There may also be a lack of sufficient public telephone network infrastructure. For those areas, a fixed UT with a single RAU being serviced by a satellite system or fixed relay stations is a preferred alternative.

The practical implementation of the fixed UT, however, still presents numerous challenges. What is needed is a suitable interface bus (that is, the multi-access channel) by which the RAU can be connected to multiple desksets. There is also a need for a method that will enable the desksets to share the interface bus and to prevent a collision in the interface bus when a plurality of desksets transmit packets concurrently. There is also a need for a control interface protocol that will enable the desksets to efficiently communicate with the RAU.

SUMMARY OF THE INVENTION

The present invention is directed to a control interface protocol for a wireless communication system such as a satellite telephone system. The satellite telephone system comprises a radio antenna unit (RAU) and a plurality of desksets connected to the RAU through an interface bus. A control interface protocol governs communications between the desksets and the RAU over the interface bus.

In one aspect, the present invention relates to a packet transmission system. According to the present invention, the RAU and the desksets communicate with each other using packets. Commands and data are sent in packets from the RAU to one or more desksets or from a deskset to the RAU. In one embodiment, each packet includes a start of header (SOH) byte, an address byte (ADDR), a command (CMD) byte, an argument (ARG) and a block check character (BCC). A packet begins with the SOH byte. The ADDR byte comprises a source and a destination address of the packet. The destination address allows an intended recipient to correctly receive the packet, while the source address allows a recipient to ascertain the originating source of the packet. The ADDR byte also includes a sequence number (SQN), as described in detail below.

According to one embodiment, the ARG is one byte when the most significant bit (MSB) of the CMD byte is 1, and the ARG has a variable length when the MSB of the CMD byte is 0. The BCC character is a parity check of all characters from SOH to ARG. The BCC character is formed by bit-wise exclusive OR (XOR) of each character sent, excluding those forming the SOH byte. All packets from the desksets, except negative acknowledgment (NAK) packets, are acknowledged by the RAU.

In one embodiment, the packets originating from the desksets include a source address between 1 and n, where n is an integer number that is equal to the total number of desksets connected to the RAU. A packet to a specific deskset includes a destination address, that is, the address of the deskset. A packet originating from the RAU to all desksets includes a first default address (for example, zero). A packet originating from the RAU to a deskset that does not have an address includes a second default address (for example, an integer number).

According to one embodiment, the packets are protected by horizontal and vertical parity checks. The BCC character is used for the vertical parity check. The bit at the end of each packet is used for the horizontal parity check.

In another aspect, the present invention relates to a method for handling error control for packets sent to the desksets (also referred to as "terminals") by the RAU (also referred to as the "common node"). Each packet having has modulo-sequential sequence numbers. The method includes the steps of sending a packet from the common node to one of the terminals; and sending a negative acknowledgment (NAK) from that one terminal to the common node when an error or unexpected sequence number is detected in the packet That NAK includes the sequence number of the last valid packet received. Any lost packets are re-sent from the common node to that terminal when an unexpected sequence number is detected and a reboot command is sent from the common node to that terminal when the number of missed packets exceeds a predetermined threshold or when a NAK is received at the common node from the terminal.

BRIEF DESCRIPTION OF THE FIGURES

The present invention will be described with reference to the accompanying drawings. In the drawings, like reference numbers generally indicate identical, functionally similar, and/or structurally similar elements. The drawing in which an element first appears is indicated by the leftmost digit(s) in its reference number.

FIG. 7 illustrates a variable argument command byte;

FIG. 8 illustrates an address/sequence byte;

FIG. 9 illustrates time-outs based on addresses;

DETAILED DESCRIPTION OF THE PREFERRED EMBODIMENTS

Figure 1:
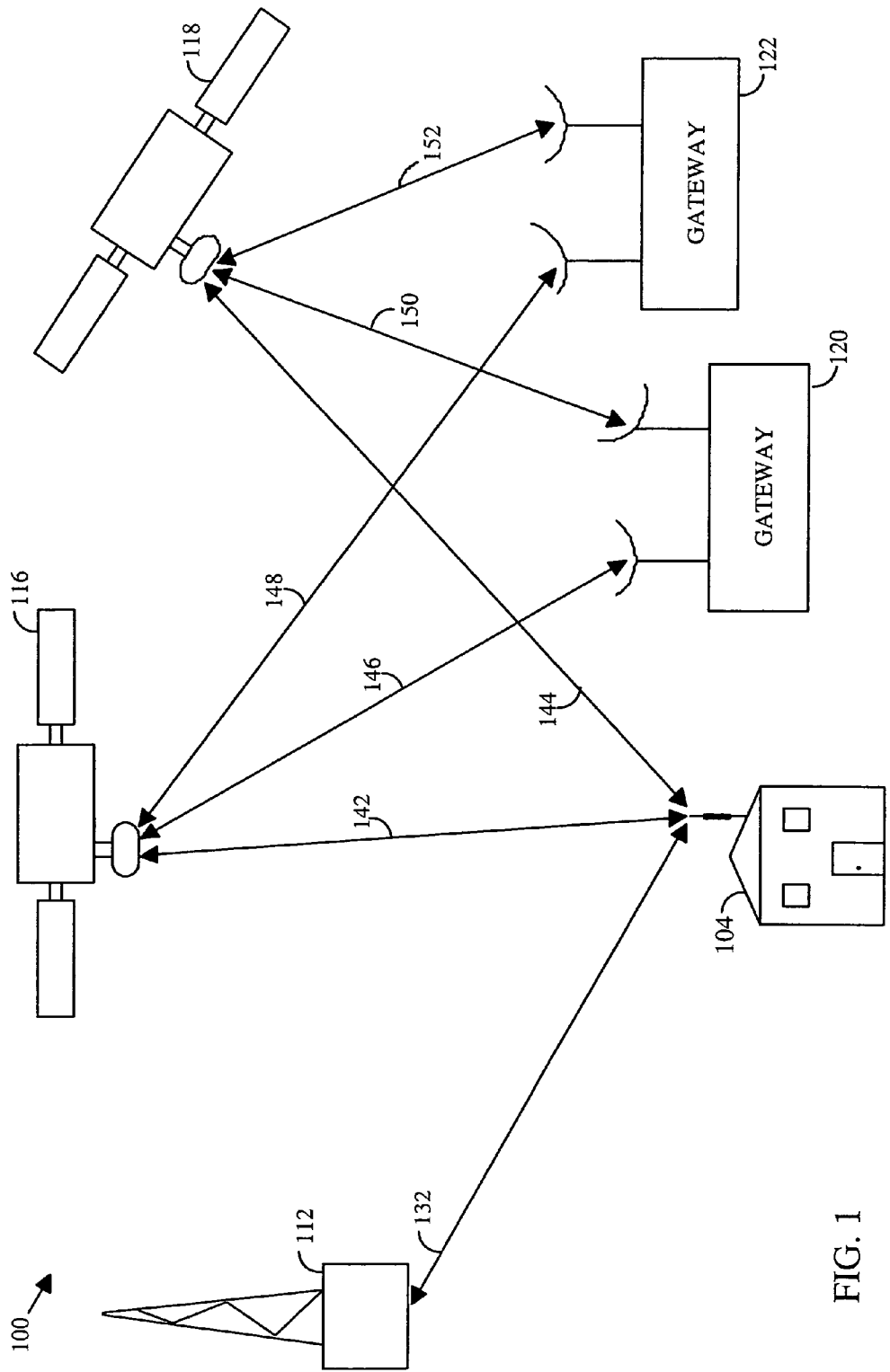
FIG. 1 illustrates an exemplary environment in which the present invention operates.

An exemplary wireless communication system in which the present invention is useful is illustrated in FIG. 1. It is contemplated that this communication system uses CDMA type communication signals, but this is not required by the present invention. In a portion of a communication system 100 illustrated in FIG. 1, one base station 112, two satellites 116 and 118, and two associated gateways 120A and 120B are shown for effecting communication with a fixed remote user terminal (UT) 104. Typically, the base stations and satellites/gateways are components of separate communication systems, referred to as being terrestrial and satellite based, although this is not necessary. The total number of base stations, gateways, and satellites in such systems depends on desired system capacity and other factors well understood in the art. UT 104 comprises a wireless communication device such as, but not limited to, a cellular telephone, a data transceiver, or a paging or position determination receiver, and can be hand-held or vehicle mounted as desired.

In FIG. 1, some possible signal paths are illustrated for communication being established between UT 104 and base station 112, or through satellites 116 and 118, with gateways 120A and 120B. The base station-user terminal communication links are illustrated by line 132. The satellite-user terminal communication links between satellites 116 and 118 and UT 104 are illustrated by lines 142 and 144. The gateway-satellite communication links between gateways 120A and 120B and satellites 116 and 118 are illustrated by lines 146, 148, 150, and 152. Gateways 120A and 120B, and base station 112, may be used as part of one or two-way communication systems or simply to transfer packets or data to UT 104.

Figure 2:
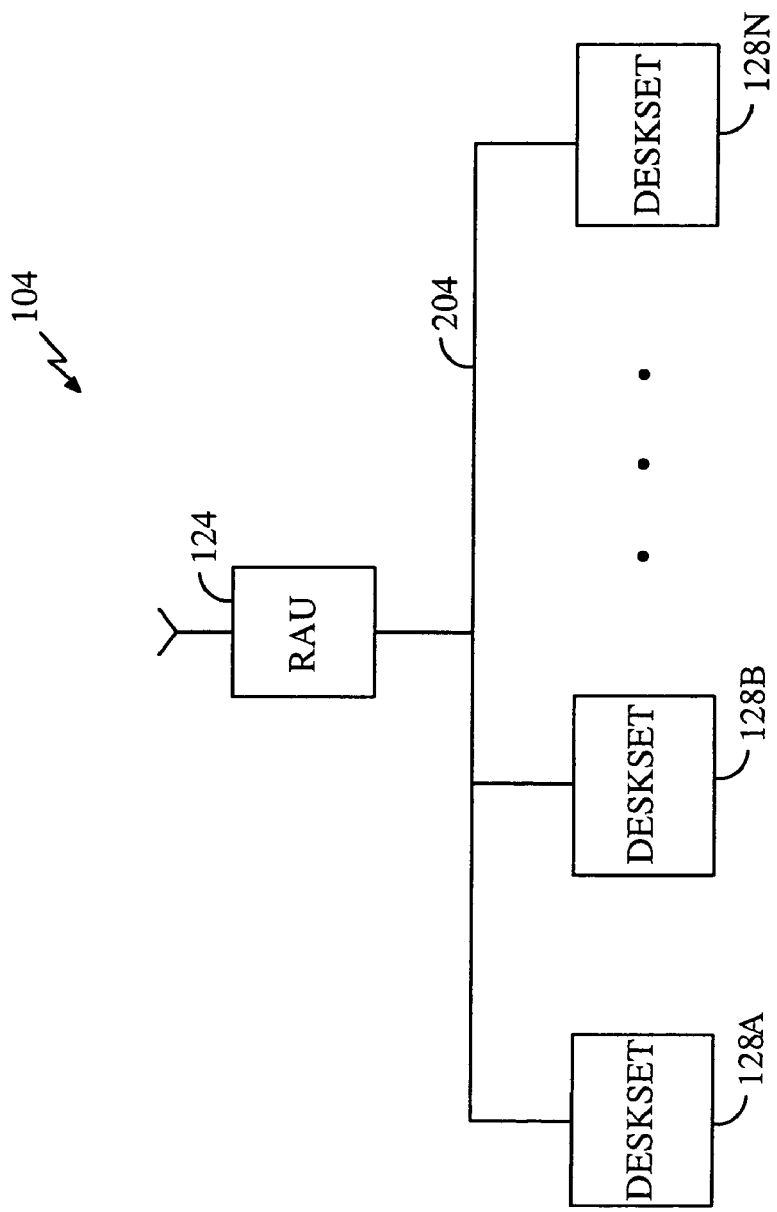
FIG. 2 is a system level diagram according to one embodiment of the present invention.

FIG. 2 is a system level diagram of a fixed UT 104 according to one embodiment of the present invention. In UT 104, an interface bus 204 connects a plurality of desksets 128a-128n to RAU 124. In operation, desksets 128 communicate over interface bus 204.

Figure 3:
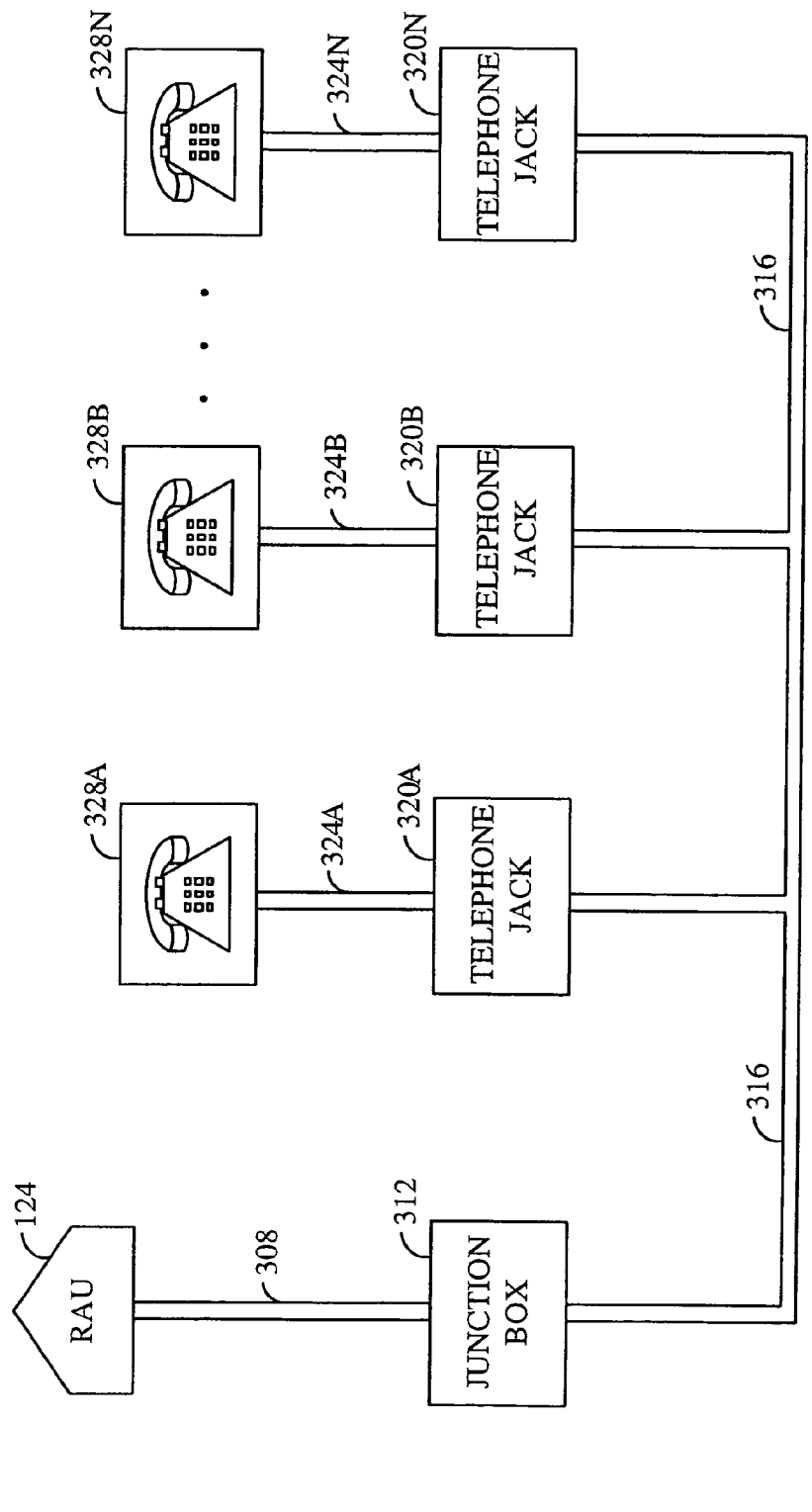
FIG. 3 illustrates a fixed user terminal system according to one embodiment of the present invention.

FIG. 3 illustrates a fixed UT system 300 according to one embodiment. Fixed UT system 300 comprises a common node (RAU 124), a shielded cable 308, a junction box (or a building entry panel) 312, an electronic industries association (EIA) 568 unshielded twisted pair (UTP) cable 316 (also referred to as a first UTP 316), one or more RJ-45 telephone jacks 320a, b . . . n, one or more four pair RJ-45 telephone cords (also referred to as a second UTP 324a, b, . . . n), and one or more terminals (desksets 328a, b, . . . n). It should be understood that components, such as EIA 568 cables or conductors, RJ-45 jacks, and building entry panels, can be easily substituted with alternative components. For example, EIA 568 UTP cable can be substituted with other unshielded cables that are well known in the industry. Likewise, RJ-45 telephone jacks can be substituted with other types of jacks that are widely available.

In one embodiment, fixed UT system 300 operates on 12 volt DC power. Fixed UT 300, however, may be configured to operate at a different voltage level or on AC power. RAU 124 can be installed on a suitable support surface or object such as, but not limited to, a roof or pole, as is known. Junction box 312 can be installed nearby in a sheltered, but still outdoor, environment. Desksets 328 can be located indoors to protect them from weather.

In one embodiment, shielded cable 308 (18 wires) connects RAU 124 to junction box 312. Shielded cable 308 comprises a deskset interface (8 wires), a data interface (8 wires) and a radio power interface (2 wires). The deskset interface in turn comprises a control interface (2 wires), an audio interface (2 wires) and a power interface (2 wires). It will become apparent to one skilled in the art that other variations of the deskset interface, the data interface, and the radio power interface can also be used. For example, other numbers of conductors may be employed in certain applications.

Second UTP 324 (8 wires) and RJ-45 telephone jacks 320 connect one or more desksets 328 to RAU 124. According to one embodiment, up to 8 desksets can be connected to junction box 312. It should be understood, however, that the present invention can easily be configured to support a higher or lower number of desksets.

Tables I, II and III below list some of the components shown in FIG. 3 according to one embodiment. Other components can be substituted for the listed components without departing from the spirit and scope of the present invention. Specifically, Table I lists constituent parts of shielded cable 308. Table II lists constituent parts of the deskset interface listed in Table I. Table III lists constituent parts of UTP cable 324.

TABLE I

Shielded Cable

| | |
|---|---|
| deskset interface | 8 wires |
| data interface | 8 wires |
| radio power interface | 2 wires |

TABLE II

Deskset Interface

| | |
|---|---|
| control interface | 2 wires |
| audio interface | 4 wires |
| power interface | 2 wires |

TABLE III

UTP Cable

| | |
|---|---|
| control interface | 2 wires |
| audio interface | 4 wires |
| power interface | 2 wires |

Figure 4:
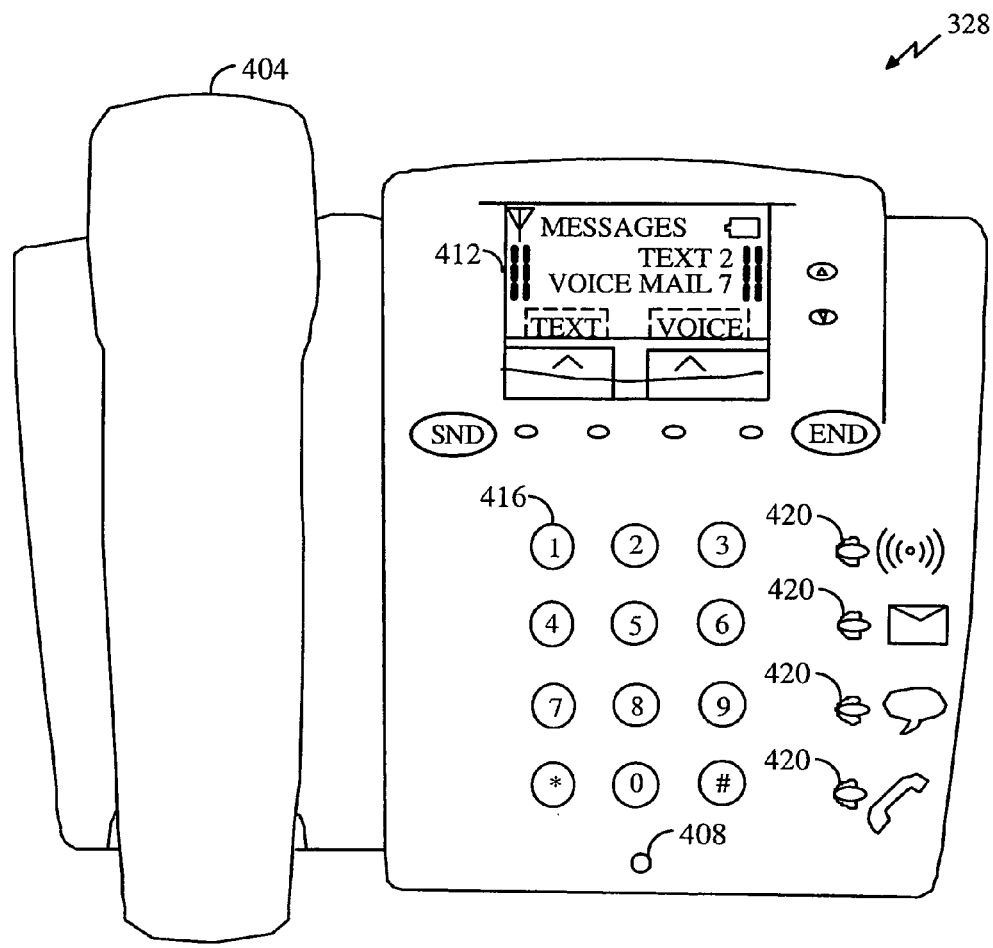
FIG. 4 illustrates a deskset according to one embodiment of the present invention.

FIG. 4 shows a deskset 328 according to one embodiment of the present invention. Deskset 328 represents a user's primary interface with the satellite telecommunications system. Deskset 328 comprises a handset 404, a ringer/speaker 408, which is also typically located on the handset or in the cradle, a mulit-line liquid crystal display (LCD) 412, here four line, a keypad 416, and light emitting diodes (LEDs) 420. LCD 412 and keypad 416 are used to access and control the features of the satellite telecommunications system. LEDs 420 indicate telephone mode and status of deskset 328. It should be understood, however, that other types or styles and configurations of desksets can also be used in the present invention.

In one embodiment, deskset 328 includes a processing element. In one embodiment, the processing element includes a microcontroller and a 2 wire EIA-485 based interface to a 386 type microprocessor in RAU 124. The processing element takes commands and data from RAU 124 and lights the LEDs, outputs commands and data to the LCD and controls various audio components. Also, deskset 328 scans the keypad and reports key state changes to RAU 124. Deskset 328 also performs certain diagnostics and reports errors to RAU 124.

In operation, RAU 124 sends commands and data in packets to one or more desksets 328. Likewise, desksets 328 send commands and data in packets to RAU 124. Note that desksets 328 do not send packets to other desksets 328. More specifically, RAU 124 sends high level commands and LCD data to one or more desksets 328. Desksets 328 send button and error data and negative acknowledgment (NAK) packets to RAU 124.

Data is transmitted as a data packet. More specifically, data is sent in asynchronous serial characters. In one embodiment, the characters are comprised of 11 bits, namely a start bit, 8 data bits, a parity bit and a stop bit. In one embodiment, the parity bit is even and the bit rate is 38,400 baud.

Figure 5:
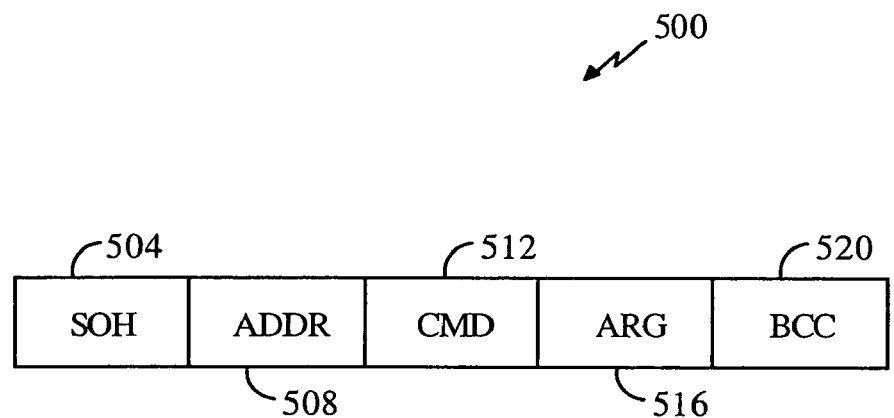
FIG. 5 illustrates a standard data packet.

FIG. 5 illustrates the structure of data packet 500 according to one embodiment of the present invention. Data packet 500 comprises a start of header (SOH) byte 504, an address (ADDR) byte 508, a command (CMD) byte 512, an argument (ARG) byte 516 and a block check character (BCC) 520. It will be apparent to a person skilled in the art that a data packet having an alternate structure can be used as well.

Referring back to FIG. 5, the structure of data packet 500 begins with SOH byte 504. In one embodiment, SOH byte 504 is an ASCII (0x01) character. Following SOH byte 504 is ADDR 508. ADDR 508 contains the source and destination address of data packet 500. The most significant bit of ADDR 508 is a source bit. In one embodiment, a sequence number (SQN) of data packet 500 is contained in bits 4, 5 and 6 of ADDR 508.

Figure 6:
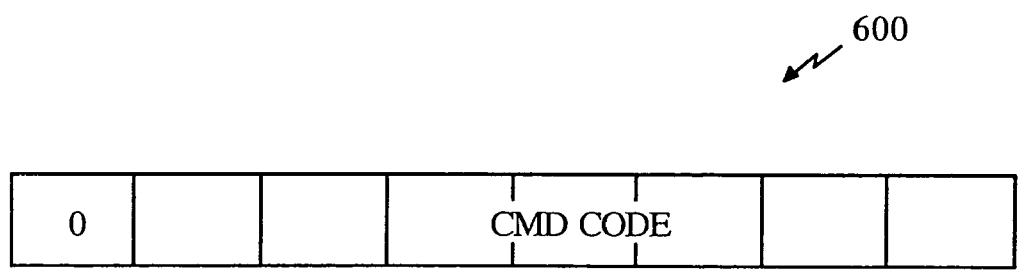
FIG. 6 illustrates a fixed argument command byte.

The third byte of data packet 500 is CMD byte 512. All commands are coded as one byte command characters followed by one or more bytes of argument (ARG). If the MSB of CMD byte 512 is 0, the ARG is one byte. If the MSB of CMD byte 512 is 1, the number of bytes in the ARG is of a variable length. FIGS. 6 and 7 illustrate a fixed argument command byte and a variable argument command byte, respectively.

Referring back to FIG. 5, data packet 500 concludes with a BCC character 516. BCC character 516 is a longitudinal parity check of all characters from SOH byte 504 to the end of the argument not including SOH byte 504. BCC character 516 is formed by bit-wise exclusive or (XOR) of each character, excluding SOH byte 504.

In an alternate embodiment, BCC character 516 may be a cyclic redundancy check (CRC) of all characters from SOH byte 504 to the end of the argument, including or not including SOH byte 504.

Packets sent by desksets 328 are normally acknowledged by RAU 124 with an acknowledge (ACK) N packet, where N is a deskset 328 address number. An exception to this rule is that negative acknowledgment (NAK) packets from desksets 328 are not acknowledged by RAU 124. The ACK N packet is an ASCII DLE (data link escape) character followed by a numeric character. The numeric character is formed by an XOR operation of 0xBØ with ADDR 508 received from deskset 328.

The packets are transmitted and received in predetermined maximum time periods. In one embodiment, the maximum time period between successive characters in a packet is 800 microseconds. Also, in one embodiment, if a deskset 328 is in the midst of receiving a packet and there is a pause of 1 ms or more, deskset 328 detects an error, and, therefore, discards the packet as erroneous, or having errors. If RAU 124 does not receive an entire packet in a 10 ms time period, that is, RAU 124 receives only a partial packet in 10 ms, it discards the partially received packet as erroneous. This allows desksets 328 to rapidly regain framing or alignment with frame boundaries or timing in the midst of packet errors. It should, however, be understood that the present invention can be configured to have other transmission and reception times for packets.

FIG. 8 illustrates the structure of an address (ADDR) byte 800. ADDR 800 comprises a source bit 804, a sequence number (SQN) 808 and a source/destination address 812.

In order to simplify processing of packets, all packets are tagged with a source bit 804 that indicates whether the source is RAU 124 or a deskset 328. Source bit 804 of a packet that originates from RAU 124 is 0. Source bit 804 of a packet that originates from a deskset 328 is 1.

Packets originating from RAU 124 and directed to one or more desksets 328 include a 3 bit SQN 808. In a preferred embodiment, the SQN is modulo-sequential; that is the SQN is incremented for each sent packet, from binary 000 to binary 111, and then to binary 000 and so on. Desksets 328 receive and process SQN 808 of all packets transmitted by RAU 124. In one embodiment, a packet from deskset 328 is tagged with a SQN 0.

Packets are tagged with either a source or a destination address depending on the packet's origin. Packets sent from a deskset 328 to RAU 124 are identified with a source address. According to one embodiment of the present invention, if there are n (n is an integer) number of desksets 328 connected to RAU 124, then a packet from deskset 328 is identified with a source address of between 1 and n. Packets sent from RAU 124 to a specific deskset are addressed with the deskset's address (between 1 and n). Packets from RAU 124 to all desksets 328 are addressed with a first default address, for example, zero. Those desksets that do not have an address yet or are currently arbitrating for an address are assigned a second default address, for example, n+1. It should, however, be understood that the addressing schemes described above are presented as an example only, and the present invention can be configured to operate using other addressing schemes. Those alternative schemes will be apparent to persons skilled in the relevant art.

As stated before, the present invention is directed to a communications protocol for a control interface for satellite telephone systems. However, the present invention may be used to provide a control interface for any type of radio telephone system where one or more desksets are connected to some type of a radio unit, such as a cellular or a PCS transceiver, a voice band point to point radio, or a packet data radio capable of receiving or transmitting digitized voice. Further, the present invention may also be used to control telephone sets connected to a box that would digitize and packetize voice data for transmission over computer networks such as the internet.

In the present invention, the control interface is shared by multiple desksets. A set of rules or protocol determine access to the control interface. The protocol used is based on carrier sense multiple access with collision detection (CSMA/CD). The protocol utilizes time-outs based on address numbers in granting access to the interface bus after an active period, a collision or in response to any request from RAU 124.

In one embodiment, the following protocol governs access to the interface bus. Each deskset 328 has a different pre-assigned time-out designated by ta1, ta2, ta3, ... or tan, where n is the address of the deskset. The time-out is the amount of time deskset 328 waits before initiating a packet transfer. The time-outs according to one embodiment of the present invention are listed in FIG. 9. It should be understood that other time-outs can also be assigned to the desksets.

Desksets 328 monitor the interface bus at all times. Before a deskset transmits a packet, it ensures that the interface bus has been idle for at least the time-out period ta. The deskset then transmits SOH byte 504. If the transmitting deskset successfully transmits SOH byte 504, it assumes that the interface bus is idle and transmits the rest of the packet. No other deskset transmits during the transmission time, because the transmission time of a packet is less than the time-outs ta for other desksets. If the interface bus is in contention, but a collision is not detected, the parity fails, and the packet is subsequently discarded. The recipient of the packet checks the parity of each byte. The recipient of the packet checks the BCC character to see if any bits were received in error. A bit received in error is a bit that is a complement of the bit transmitted.

If SOH byte 504 transmission is unsuccessful, a collision is detected. Each deskset 328 then waits for a period ta before re-transmitting. Since each deskset's ta is different, one deskset transmits before the other desksets or RAU 124. The other desksets 328 sense bus activity and wait. Since the idle time between characters in a packet is longer than the shortest ta, the erroneous SOH byte will time out and not cause a packet error. If RAU 124 receives two or more SOH byte characters in a row, it discards the first SOH byte and treats the last SOH byte as a valid SOH byte. If RAU 124 receives an SOH byte followed by a second SOH byte, it does not have a valid packet. An SOH byte is supposed to be followed by an SQN. So, in this later case, RAU 124 discards the first SOH byte and examines whether or not the remaining data forms a valid packet.

In an alternate embodiment, neither deskset 328 nor RAU 124 checks for a collision during transmission of SOH byte 504. Collision is only detected by checking the parity bytes.

Packets of information are protected by both vertical and horizontal parity checks. Parity checks are needed to detect errors due to line noise. Also, parity checks are needed to detect incorrect wiring. Parity checks also detect errors caused by collisions when two or more desksets send SOH byte 504 characters at exactly the same time.

In the event of either parity failures or BCC errors, the receiving deskset or RAU discards the packet as erroneous. RAU 304 and deskset 328 each handle packet errors differently. RAU 124 acknowledges error free packets from desksets 328, but discards packets with errors. In contrast, deskset 328 negatively acknowledges, that is, sends a NAK packet, packets with errors or partial packets that it receives.

Packets originating from desksets 328 are acknowledged in one of two ways. Normal packets are acknowledged with the ACK packet. NAK packets are acknowledged through the receipt of a valid RAU packet with a valid SQN number.

If deskset 328 does not receive an ACK packet within a predetermined time period, it re-sends the last packet. In one embodiment, if deskset 328 does not receive an ACK packet within 50 ms, it re-sends its last packet at time 50 ms+ta. Deskset 328 does not transmit any new packet until the current packet is acknowledged. Deskset 328 repeatedly sends the current packet every 50 ms+ta until it is acknowledged.

Figure 10:
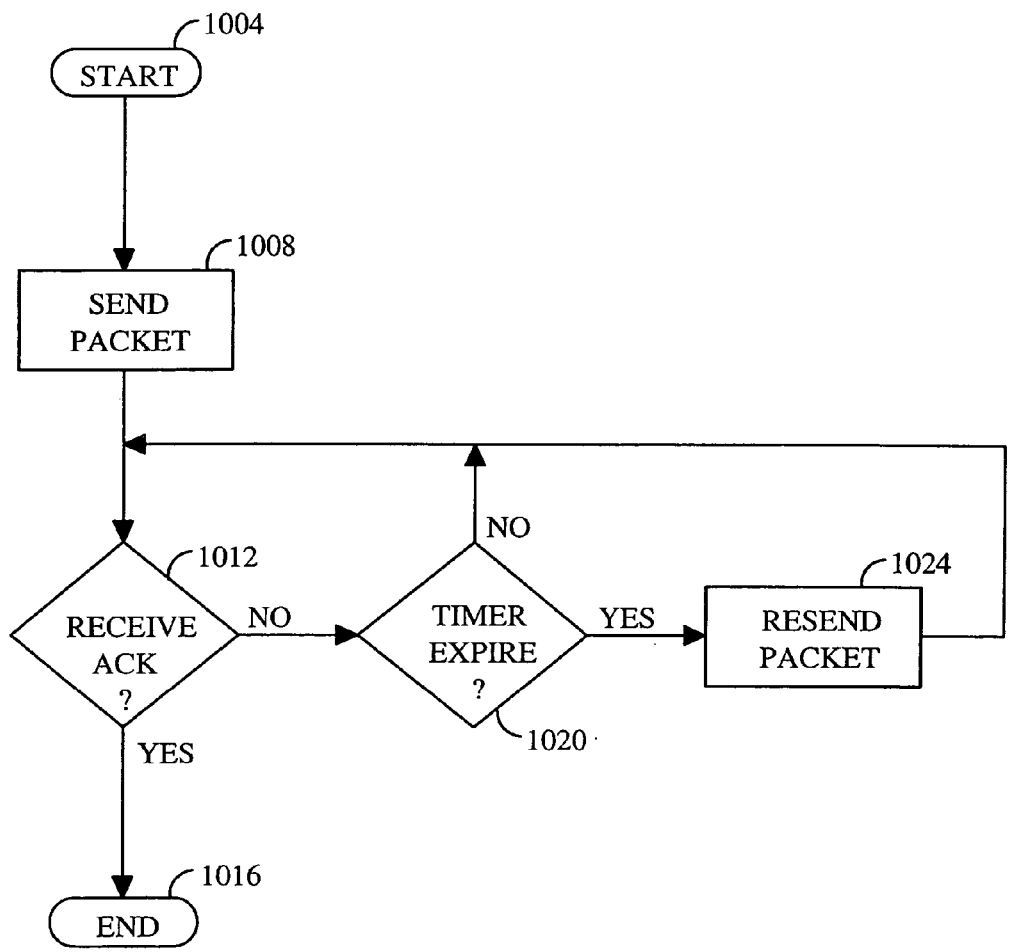
FIG. 10 is a flow diagram illustrating transmission of data packets from desksets.

FIG. 10 is a flow diagram that illustrates transmission of packets from deskset 328. In step 1004, the transmission process starts. In step 1008, deskset 328 transmits a packet. In step 1012, deskset 328 determines if an ACK has been received. If an ACK has been received, the process moves to step 1016, where the process is terminated. If an ACK has not been received, the process moves to step 1020, where deskset 328 determines if a predetermined amount or time, or a timer, has expired. If the preselected time or timer has not expired, the process returns to step 1012. If the time has expired, the process moves to step 1024, where deskset 328 re-sends the packet. Next, the process returns to step 1012.

Packets originating from RAU 124 include SQNs. Each deskset 328 keeps track of the last valid SQN received, whether or not the packet was addressed to that deskset 128. If deskset 328 receives a packet with errors, it sends a NAK packet. The NAK packet includes the SQN of the last valid data packet received from RAU 124.

Desksets 328 detect missing packets by checking SQNs. If the SQN of the most recent packet is one greater than the SQN of the previous packet, the most recent packet is valid and is processed normally. If the most recent packet's SQN is the same as the SQN of the previous packet, the most recent packet is assumed to be a repeat, and is ignored. If the SQN of the most recent packet is one less than the SQN of the previous packet, the most recent packet is also ignored. Any other SQN causes deskset 328 to send a NAK packet.

RAU 124, upon receiving a NAK packet, sends the last, or last few, packets. For example, if the last packet transmitted by RAU 124 was packet #2 and RAU 124 receives a NAK packet #1, RAU 124 knows that deskset 328 has not yet received packet #2. So, RAU 124 resends packet #2. If RAU 124 last sent packet #3, and receives NAK packet #1, it resends packets #2 and #3. If RAU 124 sends packet #3, and it gets a NAK packet #4, it can't be sure how many packets deskset 128 has missed, and so it resets deskset 328. In one embodiment, RAU 124 sends a reboot command to deskset 328. The reboot packet causes deskset 328 to reboot, thereby resetting its internal state to a known initial state.

Figure 11:
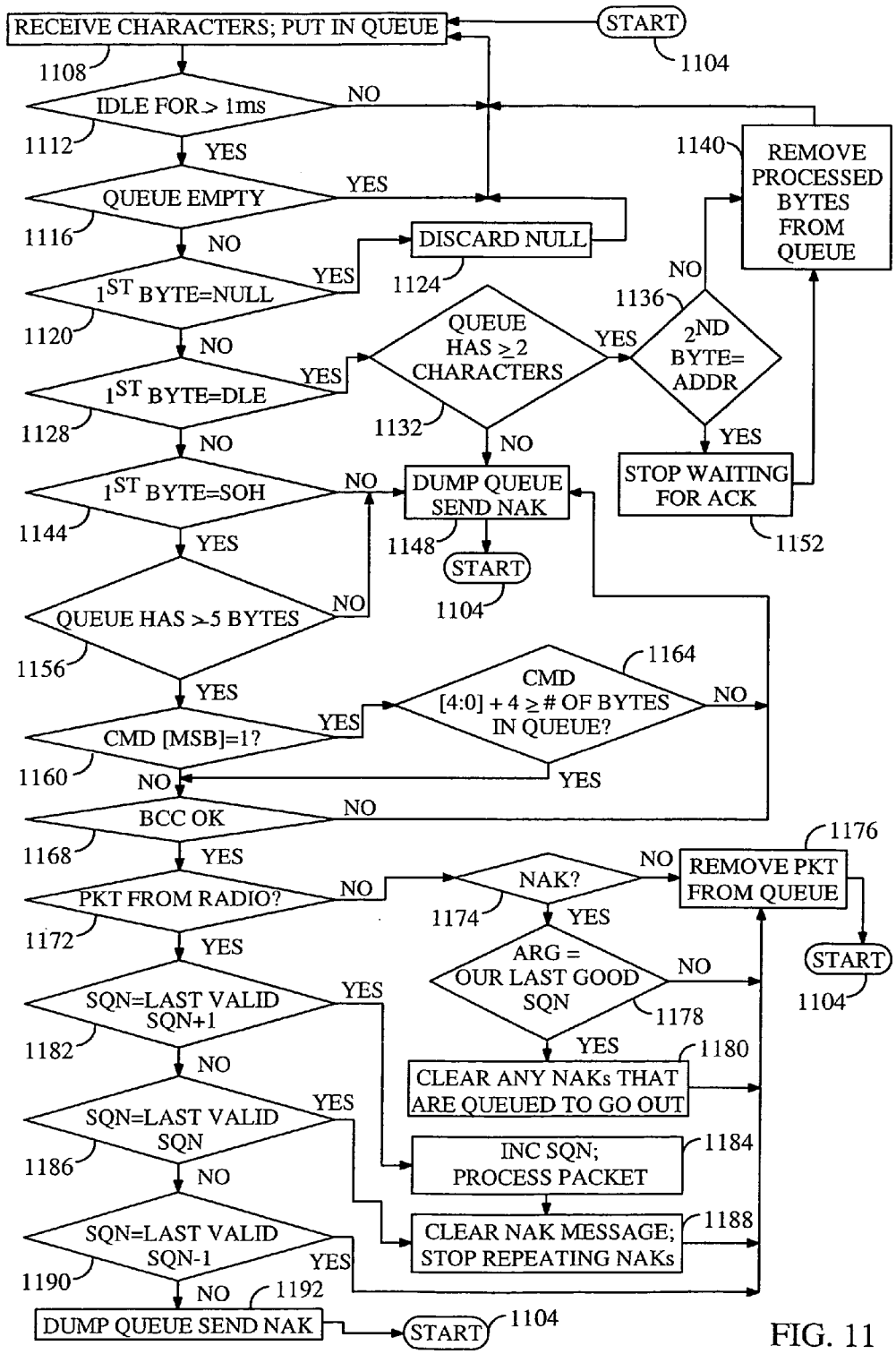
FIG. 11 is a flow diagram that illustrates processing of data packets by a deskset.

If multiple desksets 328 receive erroneous packets from RAU 124, only one NAK packet is sent from a deskset 328. Desksets 328 monitor the interface bus for other deskset NAK packets. If another deskset 328 sends a NAK packet with equal or lower SQN, the deskset that has not yet sent a NAK packet need not, and will not. FIG. 11 is a flow diagram that illustrates processing of data packets by deskset 328 according to one embodiment of the present invention. Referring now to FIG. 11, the process begins in step 1104. In step 1108, deskset 328 receives characters (for example, SOH, ARG, BCC, etc) and the characters are queued in the deskset's memory. In step 1112, deskset 328 determines if the interface bus has been idle for 1 ms or more. If the interface has been idle for 1 ms or more, the process moves to step 1116. Otherwise, the process returns to step 1108.

In step 1116, deskset 328 determines if the queue in the deskset's memory is empty. If the queue is not empty, the process moves to step 1120, where deskset 328 determines if the first byte in the queue is a null (that is, zero). If the first byte is a null, the process moves to step 1124, where the first byte (that is, the null) is discarded. If the first byte is not a null, the process moves to step 1128, where deskset 328 determines if the first byte in the queue is equal to an ASCII data link escape (DLE) character (0x10 or 10 hex). If the first byte in the queue is equal to a DLE, the process moves to step 1132, where deskset 328 determines if the queue has 2 or more characters. If the queue has 2 or more characters, the process moves to step 1136, where deskset 328 determines if the second byte is the deskset's ADDR. If the second byte is not the ADDR, the process moves to step 1140, where bytes that have already been processed are removed from the queue. Next, the process returns to step 1116. If the second byte is equal to the deskset's ADDR, the process moves to step 1152, where deskset 328 stops waiting for an ACK packet and the process then returns to step 1140.

Referring back to step 1132, if the queue does not have 2 or more characters, the process moves to step 1148, where the characters in the queue are discarded, deskset 328 sends a NAK packet, and the process returns to step 1104. If the first byte in the queue is not equal to DLE, the process moves to step 1144, where deskset 328 determines if the first byte in the queue is an SOH byte. If the first byte in the queue is not an SOH byte, the process proceeds to step 1148. If the first byte is an SOH byte, the process moves to step 1156, where deskset 328 determines if the queue has 5 or more bytes. If the queue has 5 or more bytes, the process moves to step 1160, where deskset 328 determines if the most significant bit of the CMD byte is 1. In other words, deskset 328 determines if there is a variable length packet in the queue. If the most significant bit of CMD byte is 1, then the process moves to step 1164, where it is determined if there are enough bytes in the variable length packet. In one embodiment, if in addition to 5 bits in the ARG, there are 4 bytes for overhead, then there are enough bytes, and the process moves to step 1168. Otherwise, the process returns to step 1148.

Referring back to step 1168, deskset 328 determines if the BCC character is valid. If the BCC character is invalid, the process returns to step 1148. If the BCC character is valid, the process moves to step 1172, where deskset 328 determines if the packet is from RAU 124. If the packet is not from RAU 124, the process moves to step 1174, where it is determined if a NAK packet has been received. If a NAK packet has not been received, the process moves to step 1176, where the packet is removed from the queue because the packet is not from RAU 124, but rather from a deskset, and the process then returns to step 1104. If a NAK packet has been received, the process moves to step 1178, where it is determined if the ARG byte of the packet is equal to the SQN of the last valid packet. If the ARG is not equal to the SQN of the last valid packet, the process returns to step 1176. Otherwise, the process moves to step 1180, where NAK packets that are queued to be sent out are cleared and the process then returns to step 1176.

Referring back to step 1172, if deskset 328 determines that the packet is from RAU 124, the process moves to step 1182, where deskset 328 determines if the SQN is equal to the last valid SQN +1. If the SQN is equal to the last valid SQN +1, the last valid SQN is incremented and the packet is processed. Then the process moves to step 1188, where NAK packets are cleared, and deskset 328 stops repeating NAK packets. If the SQN is not equal to the last valid SQN +1, the process moves to step 1186, where deskset 328 determines if the SQN is equal to the last valid SQN. If the SQN is equal to the last valid SQN, the process returns to step 1188. If the SQN is not equal to the last valid SQN, the process moves to step 1190, where deskset 328 determines if the SQN is equal to the last valid SQN−1. If the SQN is equal to the last valid SQN−1, the process returns to step 1176. Otherwise, the process moves to step 1192, where the packets in the queue are discarded, NAK packet is sent, and the process then returns to step 1104.

While an embodiment of the present invention has been described above, it should be understood that it has been presented by way of example only, and not limitation. Thus, the breadth and scope of the present invention should not be limited by the above-described exemplary embodiment, but should be defined only in accordance with the following claims and their equivalents.

What we claim as the invention is:

1. In a communication system having a plurality of terminals connected to a common node by a digital interface bus, a method for handling error control for packets sent to the terminals by the common node, each packet having modulo-sequential sequence numbers, comprising the steps of:
 sending a packet from the common node to one of the terminals;
 performing collision checking on the bus; and
 sending a negative acknowledgment (NAK) from said one of the terminals to the common node when an error or unexpected sequence number is detected in said packet, wherein said NAK includes a sequence number of a last valid packet received.

2. The method of claim 1, further comprising the step of re-sending any lost packets from the common node to said one of the terminals when the unexpected sequence number is detected.

3. The method of claim 1, further comprising the step of sending a reboot command from the common node to said one of the terminals when the number of missed packets exceeds a predetermined threshold.

4. The method of claim 1, further comprising the step of sending a reboot command from the common node to said one of the terminals when a NAK is received at the common node from said one of the terminals.

5. The method of claim 1, further comprising the steps of:
   determining that a current packet is new when a sequence number in the current packet is one greater than a sequence number in a previous packet;
   determining that the current packet is repeated when the sequence number in the current packet equals the sequence number in the previous packet;
   determining that the current packet is repeated when the sequence number in the current packet is N less than the sequence number in the previous packet, where N is a predetermined threshold; and
   detecting a bad sequence number otherwise.

6. The method of claim 1, further comprising the step of detecting an error based on a block check character in said one of the packets.

7. The method of claim 1, further comprising the step of detecting an error when a predetermined period elapses between receipt of successive characters in said one of the packets.

8. The method of claim 1, wherein the collision checking is based on a different pre-assigned time-out period for each terminal.

9. A common node in a communication system, the common node connected to a plurality of terminals by a digital interface bus, the common node configured to handle error control for packets sent to the terminals, each packet having modulo-sequential sequence numbers, comprising:
   means for sending a packet to one of the terminals;
   means for performing collision checking on the bus; and
   means for receiving a negative acknowledgment (NAK) from said one of the terminals if an error or unexpected sequence number is detected in said packet, wherein said NAK includes a sequence number of a last valid packet received.

* * * * *